Nov. 12, 1929.　　J. H. HELWIG ET AL　　1,735,317
BOLT AND WIRE CUTTER
Filed Feb. 23, 1927
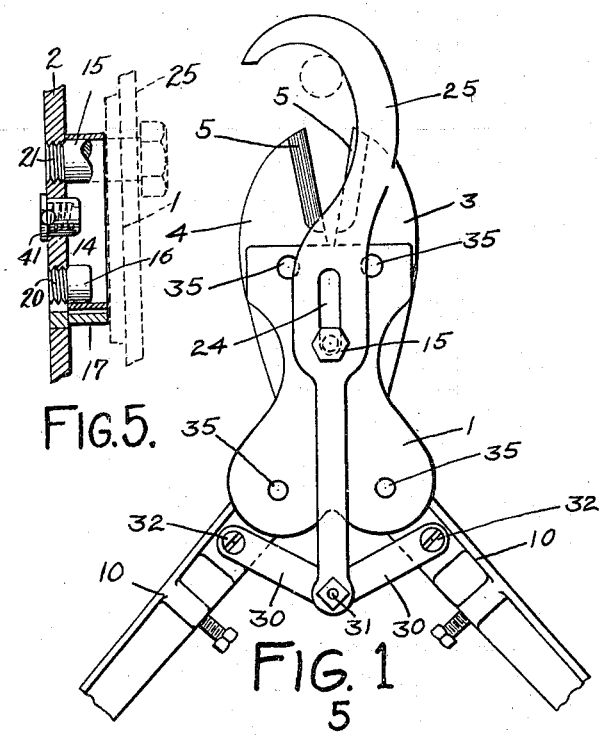
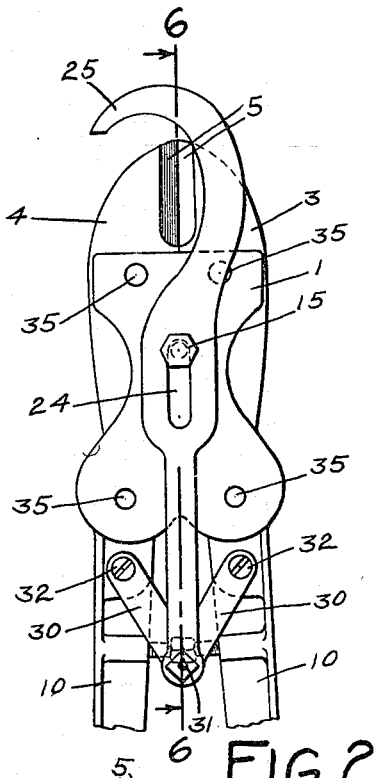
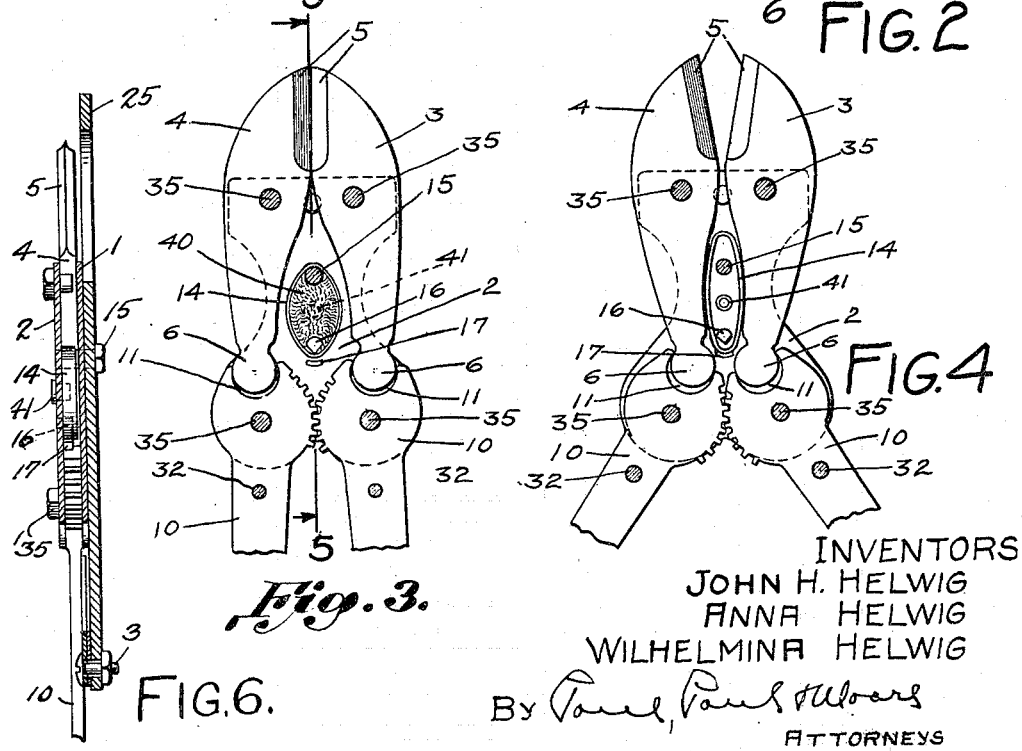
INVENTORS
JOHN H. HELWIG
ANNA HELWIG
WILHELMINA HELWIG
ATTORNEYS Patented Nov. 12, 1929

1,735,317

UNITED STATES PATENT OFFICE

JOHN H. HELWIG, ANNA HELWIG, AND WILHELMINA HELWIG, OF ST. PAUL, MINNESOTA

BOLT AND WIRE CUTTER

Application filed February 23, 1927. Serial No. 170,233.

This invention relates to improvements in bolt and wire cutters.

Objects of the invention are to provide guiding means to direct the article to be cut toward the jaws; to provide oiling means operable after or during each cutting operation; to provide means for translating the guide means outwardly and inwardly as the jaws are opened and closed; and to provide means for assembling the parts so that they may be quickly disassembled.

Other objects are; to cause one of the jaws at the cutting end, to act as a wire guide or finger.

Features of the invention include; the use of threaded bolts as pivots for the various parts, acting to secure the parts in assembled position; the provision of a resilient and compressible element arranged between the jaws to contain oil soaked material, and compressible by the jaws for squeezing the oil from the material; the provision of translatable guide means for engaging the material to be cut and guiding it toward the jaws, said means operable to draw the element toward the jaws as the jaws close; means for centering the compressible oiler element, a portion of the means acting also to secure the translatable guide in operative position; means for centering and preventing translation of the oiler element; and the various combinations and sub-combinations of the parts including all the details of construction, and arrangements of the parts.

Other objects, certain advantages and other features of the invention will be disclosed in the description of the drawings forming a part of this application and in said drawings, Figure 1 is a face view of the side showing the jaws open and the finger spaced outwardly from the jaws;

Figure 2 is a view similar to Figure 1 showing the jaws closed, and the finger translated to a point nearer the cutters;

Figure 3 is a view corresponding to Figure 2 with one of the face plates removed, and illustrating the arrangement of the oiling device;

Figure 4 is a view similar to Figure 3 and corresponding to Figure 1 showing the cutters separated;

Figure 5 is a detail section substantially on line 5—5 of Figure 3, further illustrating the arrangement of the oiler;

Figure 6 is a section on line 6—6 of Figure 2.

The device comprises a pair of plates 1—2 between which are pivoted a pair of cutter jaws 3—4. These cutter jaws are of lever-like configuration, are intermediately pivoted, and are each provided with a cutting edge 5. The opposite end of each lever provides a knuckle construction generally indicated at 6. The knuckle ends of the levers are separated as shown in Figure 3 when the cutting edges are together.

Handle levers 10 are also pivoted between the plates, and have recesses 11 to receive the knuckles 6, levers being thus provided to operate the jaws.

An oiling device is provided as a feature of this invention and comprises a resilient compressible element 14, arranged between the jaws and adapted to contain an oil soaked material. This element is arranged, in this instance, to be compressed by the inner arm portions of the jaws, as the jaws are opened. See Figure 4 which shows the element compressed. This element may be considered as a chamber-former, since the element cooperates with the plates to form a chamber. Studs 15, 16 and 17 are provided for securing and centering the element, to cause the same to be compressed and elongated in a direction toward the cutters, as the jaws open. The elements 15 and 16 are arranged within the ring-like element 14 and the element 17, at the outer side of the ring 16, cooperates with the element 16 to secure the element 14 against translation. When the element is expanded as shown in Figure 3 the inner sides thereof engage the studs 15 and 16. These studs are removably connected, being respectively provided with threads 20—21. The stud 15 has the form of a headed, threaded bolt which traverses both plates 1 and 2. This stud 15 also acts to removably secure and guide a finger 25, the said finger being attached against the outer face of the plate 1, for translation. The stud 15 traverses a slot 24 of the finger 25 for this purpose.

This guide finger, which forms a feature of the invention, is arranged adjacent the meeting line of the cutters and extends outwardly therebeyond. The finger is mounted for translation substantially in direction of the meeting line of the cutters. The guide is connected at its inner end in a manner to be moved inwardly toward the jaws as the jaws are brought to cutting position. The connection is made between the finger and the jaw-operating handles 10, and comprises a pair of links 30 each having a common pivotal connection as at 31 to the finger, and each is pivoted with a respective lever as at 32. When the lever handles are spread or opened as shown in Figure 1, the links are also spread, the action of spreading being to translate the finger outwardly beyond the cutting edges. When the handles are brought together as shown in Figure 2 the finger is translated in opposite direction or toward the cutting edges, the links being correspondingly brought toward one another.

Another feature of this invention includes the use of threaded bolts 35 as means for pivoting the jaws and levers or handles and as means for detachably securing the parts, thus providing a structure which can be quickly assembled or disassembled. The construction whereby element 15 acts as a pivot and securing means for the finger as well as a centering means for the oiler is also a feature of the invention.

The numeral 40 indicates absorbent material arranged within the oiler element so that when said element is compressed the oil is squeezed from the material. A ball valve containing casing or thimble 41 provides a passage communicating interiorly of the resilient element, for the introduction of the oil thereinto.

The studs center the compressible chamber-forming element which is herein of elliptical form with its major axis extending toward and substantially in the same direction as the meeting line of the cutting edges of the jaws.

We claim as our invention:

1. A device of the class described, including a pair of pivoted cutter jaws, and a translatably mounted guide finger arranged adjacent the meeting line of the cutters and extending outwardly therebeyond as a guide, handle levers to operate the jaws, and connections between the finger and handles to translate the finger as the handles are moved.

2. A device of the class described, including a pair of pivoted cutter jaws, and a finger arranged adjacent the meeting line of the cutters and extending outwardly therebeyond as a guide, said finger being mounted for translation substantially in direction of the meeting line of the cutters, handles connected to operate the jaws, and connections between said finger and handles to move the finger inwardly toward the cutters as the handles are brought together.

3. A device of the class described including a pair of pivoted cutter jaws, and a finger arranged adjacent the meeting line of the cutters and extending outwardly and therebeyond as a guide, said finger being mounted for translation and being connected to move inwardly toward the jaws as the jaws are brought to cutting position.

4. A device of the class described including a pair of jaws and a pair of handles connected for operating the jaws for cutting, a finger slidably arranged adjacent the cutting faces of the jaws and extending outwardly therebeyond, and connections between said finger and the jaw operating handles to translate the finger inwardly toward the jaws as the same are brought to cutting position.

5. A device of the class described comprising a pair of plates having lever-like cutter jaws pivoted therebetween, a pair of hand levers also pivoted between the plates and cooperating with the jaws to bring them to cutting position when the levers are brought together, a finger guide extending outwardly beyond the cutting portions of the jaws and arranged laterally of said cutting portions, and slidable upon one of the plates in a direction substantially parallel to the meeting line of the cutting portions, and links connecting said finger guide with said levers to translate the guide inwardly as the cutting edges are brought together.

6. A device of the class described comprising a pair of plates having jaws pivoted therebetween, a pair of handle levers between the plates engaging the jaws to bring them to cutting position when the levers are brought together, a guide extending outwardly beyond the cutting portions of the jaws and arranged laterally of said cutting portions, means slidably securing the guide, including a pin having threaded engagement with one of the plates, and links connecting said element with said levers to translate the guide inwardly as the levers and cutting edges are brought together.

7. A device of the class described comprising a pair of plates having pivoted cutter jaws therebetween a compressible resilient annular element arranged between the plates and jaws, a finger arranged upon the outer face of one of the plates, and studs for securing and centering the resilient element, one of the studs acting to secure said finger for translation, and traversing both plates and having threaded engagement with one.

8. A device of the class described including a pair of plates and cutter jaws pivoted therebetween, a guide finger arranged adjacent the meeting line of the cutters and extending outwardly therebeyond as a guide, handle levers to operate the jaws, connections between the finger and handles to translate the finger as the handles are moved, a resilient compressible element arranged between the jaws to be compressed by the jaws as the same are opened, and said guide finger being mounted for translation by a bolt which passes through a slot in said finger and through the plates and through the resilient compressible element to assist in securing that element in operative position between the jaws.

9. A device of the class described including a pair of plates and cutter jaws pivoted therebetween, a guide finger arranged adjacent the meeting line of the cutters and extending outwardly therebeyond as a guide, handle levers to operate the jaws, connections between the finger and handles to translate the finger as the handles are moved, a resilient compressible element arranged between the jaws to be compressed by the jaws as the same are opened, and said guide finger being mounted for translation by a bolt which passes through a slot in said finger and through the plates and through the resilient compressible element to assist in securing that element in operative position between the jaws, and an oil cup in one of the plates leading into said compressible element.

In witness whereof, we have hereunto set our hands this fourteenth day of February, 1927.

JOHN H. HELWIG.
ANNA HELWIG.
WILHELMINA HELWIG.